United States Patent Office 2,705,228
Patented Mar. 29, 1955

2,705,228

UNSATURATED ACID ESTERS OF HYDROXYALKYLCARBOXYALKYLAMINES AND POLYMERS

Hilmer E. Winberg, Wilmington, Del., assignor to E. I. du Pont de Nemours and Company, Wilmington, Del., a corporation of Delaware No Drawing. Application May 15, 1952,
Serial No. 288,023

7 Claims. (Cl. 260—85.5)

This invention relates to polymerizable compounds and more particularly to those containing a tertiary amino nitrogen and a carboxylic group.

Polymerizable vinylidene compounds have achieved considerable importance in recent years for the preparation of polymeric compounds. Certain of the polymers have fiber forming properties and are technically important for textile applications. In general, inertness under most conditions is a desirable property. Such inertness is displayed by acrylonitrile polymers and, in general, by polyvinyl halides and polyvinylidene halides. This inertness is not however so desirable when there is question of dyeing the polymer using conventional dyeing procedures.

This invention has as an object the preparation of new polymerizable monomeric materials which can be employed in the preparation of homopolymers and copolymers and which contain reactive groups capable of further chemical reaction. A further object is the preparation of new intermediates. Another object is the preparation of new polymers. Other objects will appear hereinafter.

These objects are accomplished by the invention of new polymerizable tertiary amines wherein the only nonaromatic unsaturation is that of a vinylidene, $CH_2=C<$, group linked to one valence of the tertiary amino nitrogen by a

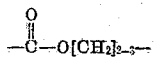

group, another valence of the tertiary amino nitrogen being bonded to a group, $-R_3COOR_2$, the third valence being linked either to another $-R_3COOR_2$ group or to a group $R_5$, $R_3$ being an alkylene radical preferably of one to three carbons, and $R_2$ and $R_5$ are preferably lower (one to four carbons) alkyl radicals. Particularly useful because of their preparability from readily available commercial materials and because of the desirable properties of the polymers therefor are the trialkylamines wherein one of the alkyl groups is of two to three carbons and has one substituent, a vinylidene CO—O— substituent, and at least one of the other alkyl groups is substituted by either a carboxylic acid, COOH, group or a salt or ester thereof, the trialkylamine having only the carboxy and the one vinylidene CO—O— substituents.

Compounds of the present invention may be made in various ways, e. g., by the reaction of an ester forming acrylic compound, i. e., acrylyl halide, with a hydroxy tertiary amine which contains a carbalkoxy group. Their polymers, including copolymers, are obtained by subjecting the monomers to polymerizing conditions in the presence of a free radical producing catalyst.

The following examples in which parts are by weight are illustrative of the invention.

EXAMPLE I

*Methyl-beta-carbomethoxyethyl-beta-methacrylyloxyethlyamine*

To a solution of 112.7 parts of N-methylethanolamine in 120 parts of methanol was added portionwise 155 parts of methyl acrylate stabilized with phenothiazine. The mixture was cooled to maintain the temperature below 40° C. The solution was then permitted to stand for two days, after which time direct distillation gave 208 parts of colorless product boiling largely at 97° C. under 2.5 mm. of mercury pressure. On redistillation the beta-hydroxyethyl-beta-carbomethoxyethylmethylamine boiled at 83–85° C. under 1 mm. of mercury pressure, $n_D^{25}$ 1.4505.

*Analysis*

Calculated for $C_7H_{15}O_3$: C, 52.15%; H, 9.38%; N, 8.69%
Found: C, 52.45%; H, 9.59%; N, 8.79%, 8.84%

To a solution of 50 parts of the above tertiary amine, 34.3 parts of triethylamine, and 50 parts of dry dioxane cooled to 10–15° C. was slowly added 32.6 parts of freshly distilled methacrylyl chloride, maintaining the temperature at 10–20° C. After the addition was complete, the mixture was warmed to room temperature, stirred for an additional two hours, then poured into 300 parts of water. The aqueous layer was saturated with sodium chloride and made slightly alkaline with dilute ammonium hydroxide. The mixture was then extracted four times with ether and the combined extracts dried over anhydrous magnesium sulfate. After filtration, the solution was distilled to give 61.3 parts of crude product boiling at 92–113° C. under 1.2–1.6 mm. of mercury pressure. On redistillation, 50.6 parts of methyl-beta-carbomethoxyethyl-beta-methacryloxyethylamine, boiling at 75° C. under 0.02 mm. of mercury pressure, $n_D^{25}$ 1.4544, was obtained.

*Analysis*

Calculated for $C_{11}H_{19}O_4N$: C, 57.62%; H, 8.36%; N, 6.16%
Found: C, 57.97%; H, 8.46%; N, 6.18%

This ester polymerized to a water-white polymer when heated in the presence of azodiisobutyronitrile for one hour at approximately 75–80° C.

EXAMPLE II

*Dimethyl gamma-methacrylyloxypropyliminodiacetate*

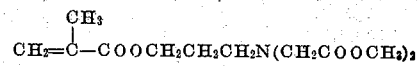

To a cold solution of 189 parts of chloroacetic acid in 150 parts of water was added slowly a cold solution of 160 parts of sodium hydroxide in 500 parts of water. To the resulting solution was added slowly 75 parts of propanolamine in 150 parts of water. During the latter addition, and for two hours thereafter, the solution was stirred and the temperature maintained below 50° C. At the end of this time, a solution of 257 parts of barium chloride dihydrate in 500 parts of hot water was added to the reaction mixture which was then heated on a steam bath for one-half hour. The precipitated barium salt was removed by filtration and washed with hot water. After vacuum drying, the salt, which weighed 222 parts, was suspended in 600 parts of water and the suspension was heated to boiling while being stirred. The calculated quantity of sulfuric acid was then introduced gradually from a separatory funnel into the well-stirred mixture over a period of about one hour. The precipitated barium sulfate was then removed by filtration and the filtrate evaporated to dryness under vacuum. The white residue of gamma-hydroxypropyliminodiacetic acid was washed with acetone and dried to give 112 parts of product, M. P. 197–199° C. (dec.).

*Analysis*

Calculated for $C_7H_{13}NO_5$: C, 43.97%; H, 6.85%; N, 7.33%
Found: C, 43.76%; H, 6.98%; N, 7.33%, 7.39%

A suspension of 50 parts of the above acid in 790 parts of dry methanol was saturated with dry hydrogen chloride while being cooled in an ice bath. After standing for 20 hours the volatile materials were removed from the clear solution under vacuum. The viscous residue was covered with anhydrous ether and dry ammonia was bubbled into the mixture while it was being stirred. After saturation, the mixture was filtered and the filtrate distilled to give 40.4 parts of dimethyl gamma-hydroxypropyliminodiacetate as a colorless viscous liquid boiling at 138° C. under 1.5 mm. mercury pressure, $n_D^{25}$ 1.4579.

Analysis

Calculated for $C_9H_{17}NO_5$: C, 49.30%; H, 7.82%; N, 6.39%

Found: C, 49.09%; H, 7.93%; N, 6.24%, 6.30%

According to the procedure of Example I, 18.3 parts of methacrylyl chloride was added to a solution of 37.5 parts of the above tertiary amine and 18.2 parts of triethylamine in 50 parts of dry dioxane. Upon distillation of the resultant reaction product 18.5 parts of dimethyl gamma-methacrylyloxypropyliminodiacetate, having a boiling point of 140° C. under 0.4 mm. mercury pressure and $n_D^{25}$ 1.4614, was obtained.

Analysis

Calculated for $C_{13}H_{21}O_6N$: C, 54.40%; H, 7.32%; N, 4.88%

Found: C, 54.70%; H, 7.56%; N, 5.01%

This ester polymerized to a water-white polymer when heated in the presence of azodiisobutyronitrile for one-quarter hour at approximately 90° C.

EXAMPLE III

*Methyl beta,beta-dimethyl-gamma-methacrylyloxypropyl-methylaminoacetate*

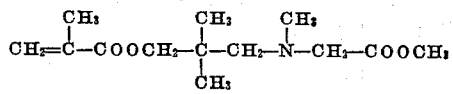

To a refluxing, vigorously stirred slurry of 73 parts of anhydrous sodium carbonate in a solution of 81.8 parts of beta,beta-dimethyl-gamma-methylaminopropanol in 395 parts of dry methanol was added slowly 117.2 parts of methyl bromoacetate. The mixture was stirred under reflux for an additional hour after the addition was complete. The mixture was then cooled and filtered and the filtrate was concentrated under reduced pressure to remove the methanol. The residual slurry was filtered and the filtrate was distilled to give 82 parts of methyl beta,-beta - dimethyl - gamma - hydroxypropylmethylaminoacetate having a boiling point of 81° C. under 0.1 mm. mercury pressure and $n_D^{25}$ 1.4481.

Analysis

Calculated for $C_9H_{19}O_3N$: C, 57.20%; H, 10.13%; N, 7.41%; Mol. Wt. 189

Found: C, 57.37%; H, 10.37%; N, 7.19%; Mol. Wt. 203 (ebullioscopic in $C_6H_6$)

According to the procedure of Example I, 32.6 parts of methacrylyl chloride was added to a solution of 56.7 parts of the above tertiary amine and 34.3 parts of triethylamine in 100 parts of dry dioxane. Upon distillation of the resultant reaction product 46 parts of methyl beta,beta- dimethyl - gamma-methacrylyloxypropylmethyl-aminoacetate, having a boiling point of 76–82° C. under 0.03 mm. mercury pressure and $n_D^{25}$ 1.4510, was obtained.

Analysis

Calculated for $C_{13}H_{23}O_4N$: C, 60.70%; H, 9.01%; N, 5.44%; Mol. Wt. 257

Found: C, 61.53%; H, 9.38%; N, 5.87%; Mol. Wt. 257 (ebullioscopic in $C_6H_6$)

This ester polymerized to a water-white polymer when heated in the presence of azodiisobutyronitrile for one-quarter hour at approximately 90° C.

EXAMPLE IV

*Preparation of acrylonitrile/methyl-beta-carbomethoxy-ethyl-beta-methacrylyloxyethylamine copolymer*

To a solution of 0.342 part of potassium dihydrogen phosphate in 190 parts water was added sufficient 0.5 N sodium to give a pH of 7. To the resulting solution was added 13 parts of redistilled acrylonitrile, 0.685 part of the methyl-beta-carbomethoxyethyl-beta-methacrylyloxy-ethylamine of Example I, 0.189 part of thiourea and 5.68 parts of 3% hydrogen peroxide solution. The whole was agitated under nitrogen at 25° C. for three hours. At the end of this time, the precipitated white polymer was collected on a filter, washed with water, followed by methanol. There was obtained 7 parts of white polymer of inherent viscosity 1.35 (0.2% solution in dimethyl-formamide at 250° C.). A film cast at 100° C. from a 15% solution of the polymer in dimethylformamide was clear, colorless and strong. It was readily dyed at a pH of 3 with typical acid dyes.

EXAMPLE V

*Preparation of acrylonitrile/dimethyl gamma-methacrylyl-oxypropyliminodiacetate copolymer*

To 190 parts of water was added 0.403 part of the dimethyl gamma-methacrylyloxypropyliminodiacetate of Example II. The pH was adjusted to 4 with dilute sulfuric acid, then 13 parts of redistilled acrylonitrile, 0.189 part of thiourea and 5.68 parts of 3% hydrogen peroxide solution were added and the polymerization was permitted to proceed under nitrogen for three hours at room temperature. At the end of this time, the precipitated polymer was isolated by filtration, washed with water, followed by acidified methanol, and dried. There was obtained 8 parts of white polymer of intrinsic viscosity 1.5 (0.2% solution in dimethylformamide at 25° C.). Films cast from 15% solutions of the polymer in dimethylformamide were colorless and tough. They dyed readily at pH 3 with acid dyes and had good thermal stability.

The compounds of this invention are polymerizable tertiary amines having one valence of the tertiary amino nitrogen attached to a methacrylyloxyalkyl or acrylyloxyalkyl group as the only non-aromatic carbon to carbon unsaturation in the amine and another valence attached by a chain containing at least two chain carbon atoms, to a carboxylic group. They have one and only one vinylidene, $CH_2=<$, group which is attached to one balence of a tertiary amino nitrogen by a chain containing at least two chain carbon atoms, which nitrogen has another valence bonded through a chain containing at least two chain carbons, to the carboxyl carbon end of a carboxylic, —COO—, group, generally a carbalkoxyl in which the alkoxyl is of a lower, one to four carbon, alkyl.

A preferred class of tertiary amines is the class of amines having the tertiary amino nitrogen bonded to an alkyl radical further substituted by a radical,

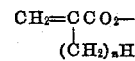

wherein $n$ is a cardinal number not greater than one and to at least one alkyl radical having as its only substitution at least one carboxyl substituent, any remaining valence of said nitrogen being bonded to an alkyl radical. These are pictured structurally as of the formula

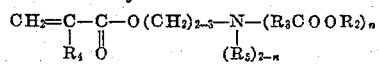

wherein $R_4$ is hydrogen or methyl and $R_3$ is an alkylene radical preferably of one to three carbons, e. g., methylene, ethylene, propylene; $R_2$ and $R_5$ are preferably lower (one to four carbon) alkyl radicals; and $n$ is an integer of one to two. The invention thus includes, in addition to the amines of the examples, N-(beta-dicarbomethoxymethylaminoethyl)methacrylamide and methyl-beta-methacrylyloxyethyl-carboxymethylamine. Alkali metal salts can also be employed.

The choice of method of preparation of any ethylenically unsaturated compound is dependent upon the specific compound. Carbalkoxy containing acrylates can be prepared by reaction of an acrylyl halide, e. g., acrylyl chloride, with a tertiary amine which contains a reactive hydroxyl group and at least one carboxylic group.

The amines of this invention are polymerizable and copolymerizable. They are reactive with reagents which react with ethylenic double bonds. By virtue of the tertiary amino group they form quaternary derivatives, e. g., by reaction with alkyl halides, alkyl sulfates, or alkyl aryl sulfonates. Hydrolysis of the carbalkoxy tertiary amines of this invention leads to substantially non-alkaline amino acids, i. e., generally neutral or acidic. Polymers and copolymers of the tertiary amines of this invention have superior dyeing properties under conventional conditions to which textile materials are subject for dyeing with acid dyes.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A tertiary amine having the tertiary amino nitrogen bonded to an alkyl radical further substituted by a radical, $$CH_2=CCO_2-$$
$$|$$
$$(CH_2)_nH$$

wherein $n$ is a cardinal number not greater than one and to at least one alkyl radical having as its only substitution at least one carboxyl substituent of the class consisting of carboxyl and one to four carbon alkyl esters thereof, attached to the alkyl of the amine by the carboxyl carbon end of said carboxyl substituent, any remaining valence of said nitrogen being bonded to an alkyl radical.

2. A tertiary amine having the tertiary amino nitrogen bonded to a methacrylyloxyethyl radical and to at least one alkyl radical having as its only substitution at least one carboxyl substituent of the class consisting of carboxyl and one to four carbon alkyl esters thereof, attached to the alkyl of the amine by the carboxyl carbon end of said carboxyl substituent, any remaining valence of said nitrogen being bonded to an alkyl radical.

3. A tertiary amine having the tertiary amino nitrogen bonded to a methacrylyloxyethyl radical and to at least one alkyl radical of one to three carbons having as its only substitution at least one carboxyl substituent of the class consisting of carboxyl and one to four carbon alkyl esters thereof, attached to the alkyl of the amine by the carboxyl carbon end of said carboxyl substituent, any remaining valence of said nitrogen being bonded to an alkyl radical of one to four carbons.

4. A polymerizable tertiary amine of the formula $$CH_2=C-C-O(CH_2)_m-N(R_1COO[CH_2]_yH)_n$$
$$|\quad\quad\quad\quad\quad\quad|$$
$$(CH_2)_xH\quad\quad\quad(R_2)_{2-n}$$

wherein $x$ is a cardinal number not greater than one, $m$ is an integer from two to three, $n$ is an integer from one to two, $y$ is a cardinal number not greater than four, $R_1$ is a divalent saturated aliphatic hydrocarbon radical of one to three carbons and $R_2$ is an alkyl radical of one to four carbons.

5. A polymer of a tertiary amine which amine has the formula $$CH_2=C-C-O(CH_2)_m-N(R_1COO[CH_2]_yH)_n$$
$$|\quad\quad\quad\quad\quad\quad|$$
$$(CH_2)_xH\quad\quad\quad(R_2)_{2-n}$$

wherein $x$ is a cardinal number not greater than one, $m$ is an integer from two to three, $n$ is an integer from one to two, $y$ is a cardinal number not greater than four, $R_1$ is a divalent saturated aliphatic hydrocarbon radical of one to three carbons, $R_2$ is an alkyl radical of one to four carbons.

6. A copolymer containing in its composition a major amount of acrylonitrile and two to ten per cent of units of a tertiary amine which amine has the formula $$CH_2=C-C-O(CH_2)_m-N(R_1COO[CH_2]_yH)_n$$
$$|\quad\quad\quad\quad\quad\quad|$$
$$(CH_2)_xH\quad\quad\quad(R_2)_{2-n}$$

wherein $x$ is a cardinal number not greater than one, $m$ is an integer from two to three, $n$ is an integer from one to two, $y$ is a cardinal number not greater than four, $R_1$ is a divalent saturated aliphatic hydrocarbon radical of one to three carbons, $R_2$ is an alkyl radical of one to four carbons.

7. A copolymer containing in its composition a major amount of acrylonitrile and two to ten per cent of units of a tertiary amine which has the tertiary amino nitrogen bonded to a methacrylyloxyethyl radical and to at least one alkyl radical of one to three carbons having as its only substitution at least one carboxyl substituent of the class consisting of carboxyl and one to four carbon alkyl esters thereof, attached to the alkyl from carboxyl carbon of the carboxyl substituent, any remaining valence of said nitrogen being bonded to an alkyl radical of one to four carbons.

References Cited in the file of this patent

UNITED STATES PATENTS

| | | |
|---|---|---|
| 2,017,537 | Hoffmann et al. | Oct. 15, 1935 |
| 2,138,763 | Graves | Nov. 29, 1938 |
| 2,311,548 | Jacobson et al. | Feb. 16, 1943 |
| 2,409,126 | Kenyon | Oct. 8, 1946 |
| 2,458,422 | Reynolds et al. | Jan. 4, 1949 |
| 2,508,718 | Jones | May 23, 1950 |
| 2,601,251 | Bruson | June 24, 1952 |